UNITED STATES PATENT OFFICE.

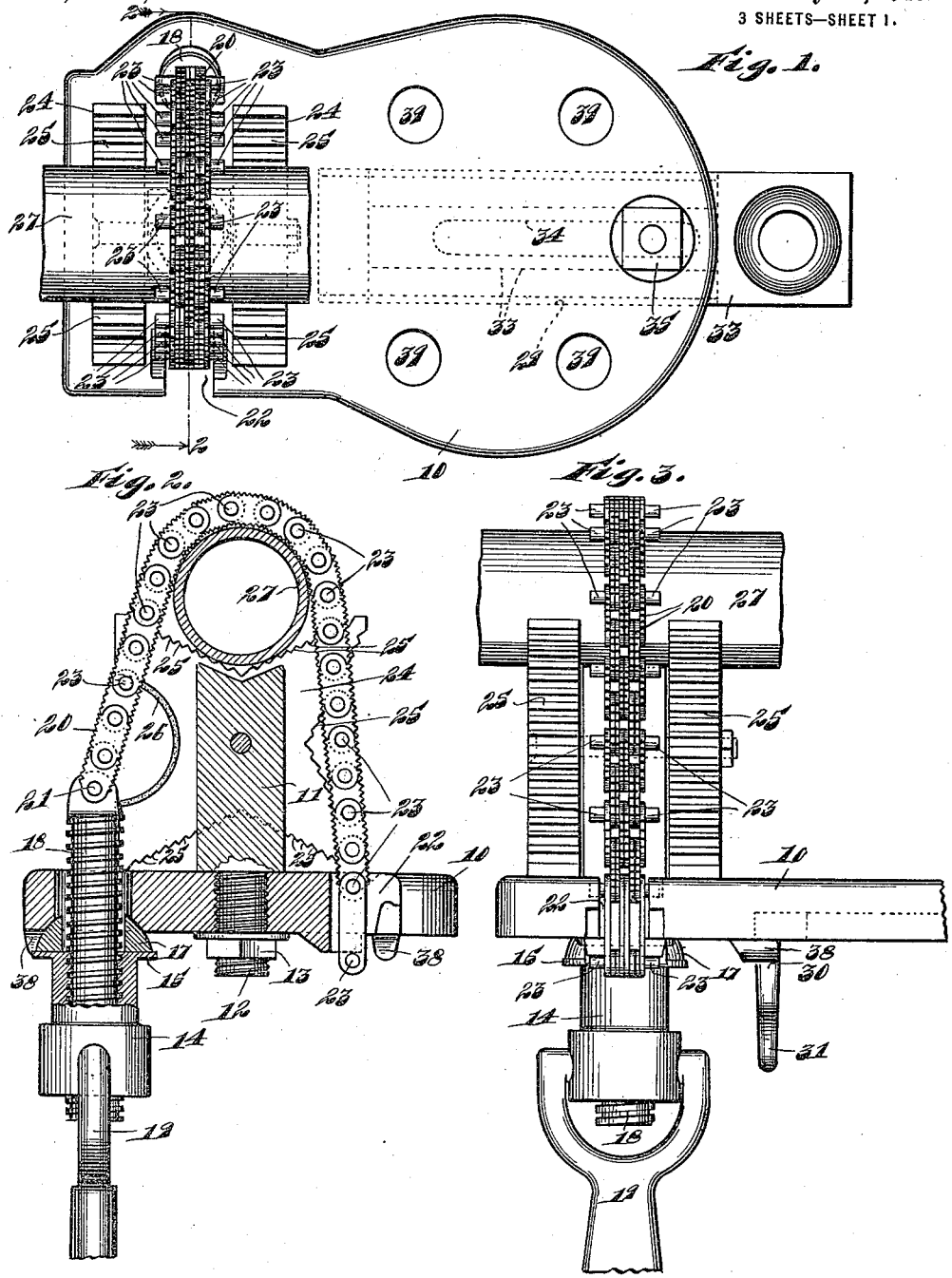

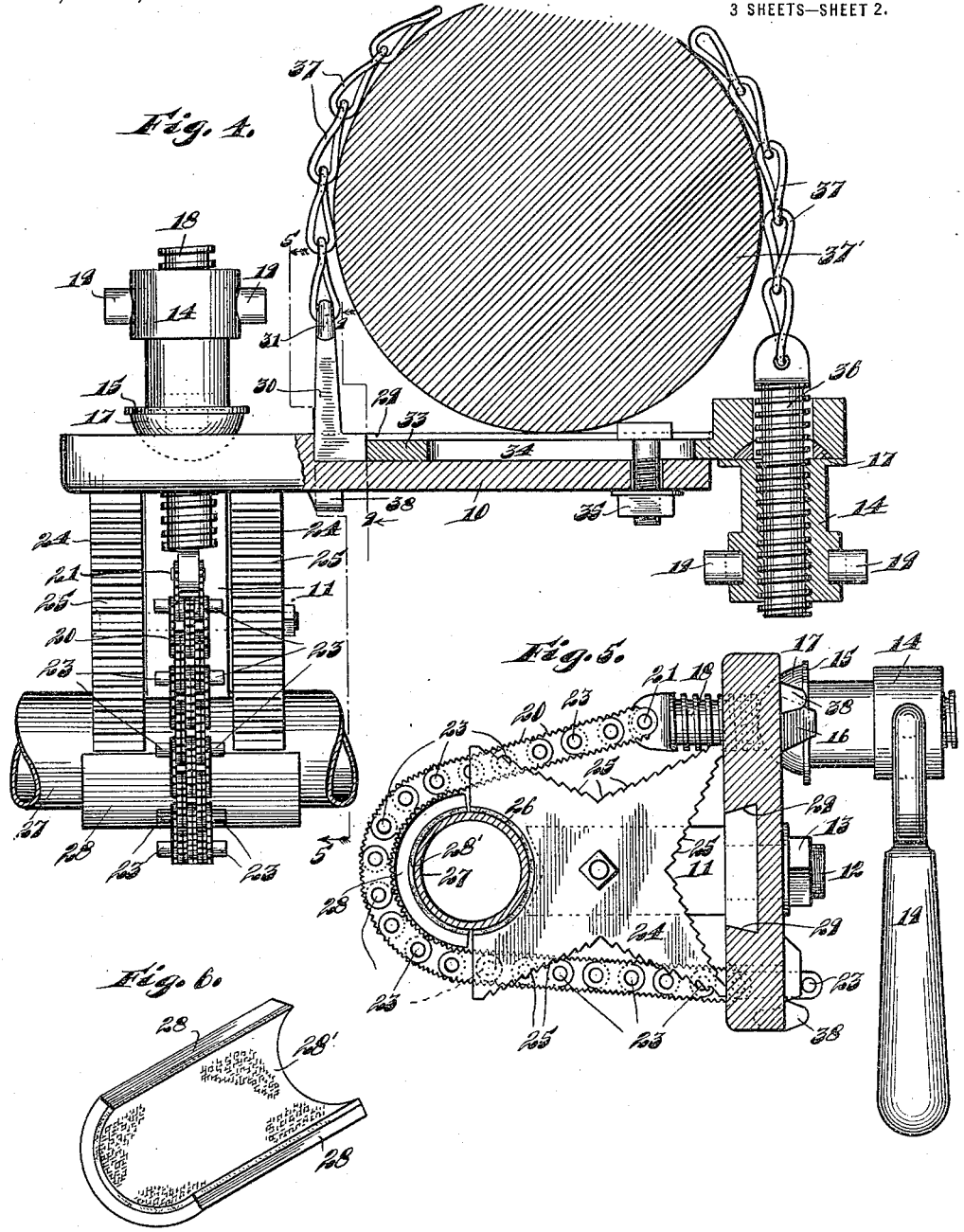

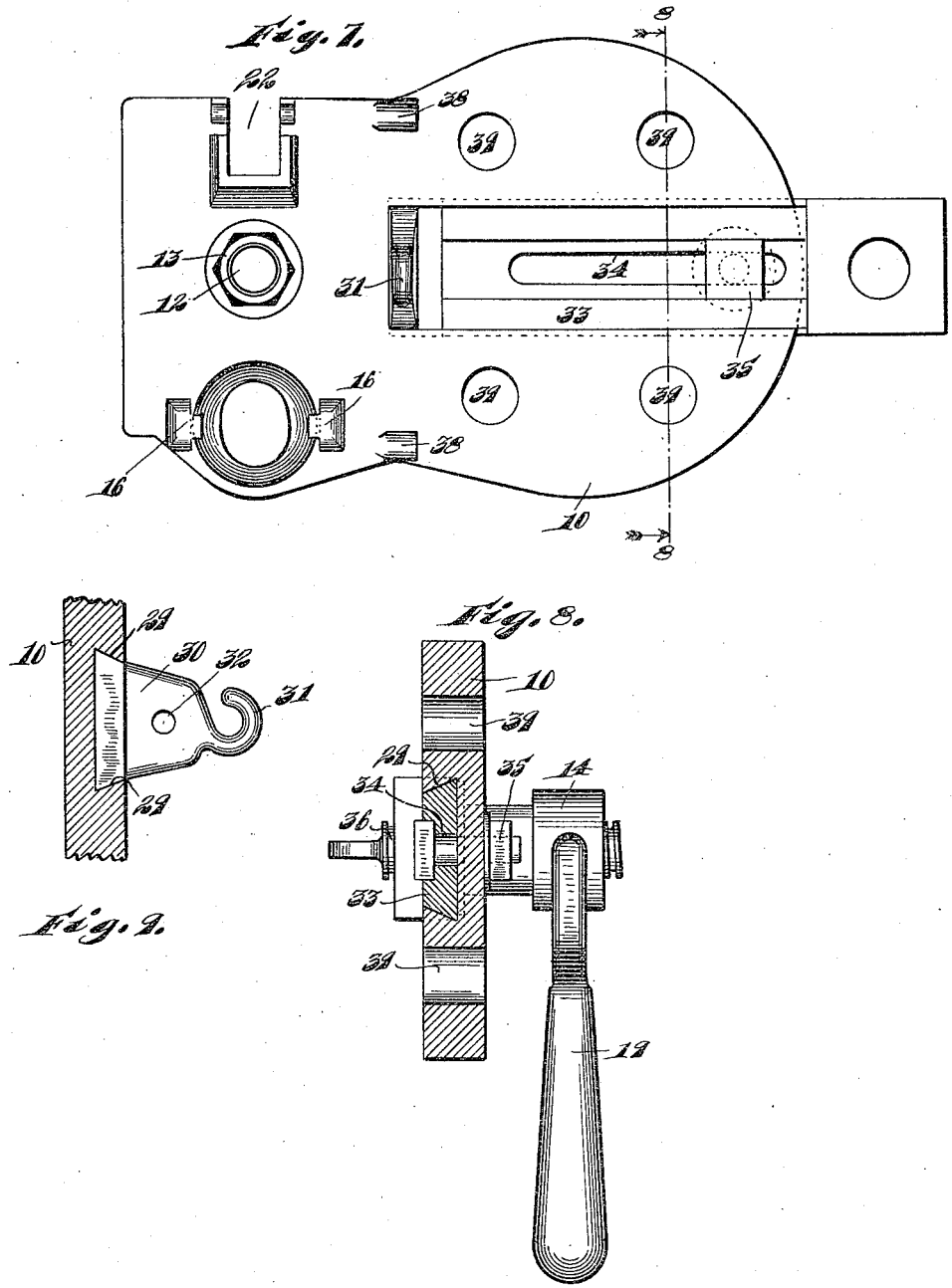

EDWARD SCHUBERT, OF CHICAGO, ILLINOIS, ASSIGNOR OF ONE-HALF TO JAMES C. TRASK, OF CHICAGO, ILLINOIS.

CHAIN VISE.

1,184,388. Specification of Letters Patent. Patented May 23, 1916.

Application filed July 3, 1915. Serial No. 37,933.

*To all whom it may concern:*

Be it known that I, EDWARD SCHUBERT, a citizen of the United States, and a resident of the city of Chicago, county of Cook, and State of Illinois, have invented certain new and useful Improvements in Chain Vises, of which the following is a specification.

My invention relates to improvements in chain vises, and has for its object the provision of an improved construction of this character which is simple and efficient in use.

The invention consists in the combinations and arrangements of parts hereinafter described and claimed.

The invention will be best understood by reference to the accompanying drawings forming a part of this specification, and in which, Figure 1 is a face view of a chain vise embodying my invention, Fig. 2, a section taken on line 2—2 of Fig. 1, Fig. 3, an elevation at right angles to Fig. 2, Fig. 4, a horizontal section showing the vise attached to a post, Fig. 5, a section taken on line 5—5 of Fig. 4, Fig. 6, a perspective view of a guard employed in conjunction with the construction, Fig. 7, a rear view of the base member of the construction, Fig. 8, a section taken on line 8—8 of Fig. 7, and Fig. 9, a section taken on line 9—9 of Fig. 4.

The preferred form of construction, as illustrated in the drawings, comprises a base plate 10 having a post 11 secured to the face thereof by means of a threaded stem 12 and nuts 13, as shown. A threaded nut or head 14 is provided with a swiveled shoulder 15 engaging under lugs 16 on the rear of base plate 10 so as to effect a swiveled joint between said base and nut, the inner end of the nut resting upon a hemispherical washer 17 operating in a correspondingly shaped recess in the base member 10. A threaded stem 18 passes freely through base member 10 and is threaded in nut 14, said nut being provided with a pivoted handle 19 by means of which the same may be operated to force said stem to and fro through the base plate 10, as will be readily understood. A clamping chain 20 is pivotally connected at 21 to the outer end of stem 18, said chain being arranged to pass over post 11 and have its other end inserted in a notch 22 in the opposite side of base plate 10. The chain 20 is provided with a plurality of laterally extending trunnions or pintles 23 adapted to engage the rear side of base plate 10 to anchor the free end of the chain and the chain itself is provided with teeth on the opposite edges thereof. Clamping members 24 are pivoted to opposite sides of post 11, each of said clamping members being provided with three toothed substantially V-shaped jaws 25 and one semi-circular jaw 26 padded with canvas belting, as indicated. By this arrangement, it will be observed that the clamping members 24 may be readily adjusted to bring coöperating clamping jaws 25 or 26 in registration with each other and that a pipe 27 laid across said coöperating jaws may be readily clamped by means of chain 20, as best indicated in Figs. 1, 2 and 3. When it is desired to operate on a pipe or similar article having a surface which cannot be marred or scarred, the jaws 26 in the clamping members 24 are adjusted into coöperating relation, and a guard member 28 lined with a canvas belt padding 28' is interposed between the chain and the pipe, as indicated in Fig. 5.

A dovetail groove 29 is provided in base plate 10 on the side opposite to that from which the post 11 projects and a hook member 30 is slidably mounted in said groove, as shown in Fig. 9. The member 30 is provided at its extreme end with a hook 31 and centrally with a screw opening 32, as shown. A slide 33 is also mounted in groove 29 and is provided with an elongated T-slot 34 coöperating with a bolt and nut 35 for adjustably securing said slide in position on the base plate 10. A threaded stem 36 is arranged at the free end of slide 33 and provided with an operating nut 14 and handle 19 similar in all material respects to the threaded stem 18 and the corresponding nut 14 and handle 19. A chain 37 is connected with the rear end of stem 36 and is adapted to encompass a post or other similar support 37' and engage hook 31 to clamp the base plate 10 to said post. Base plate 10 is also provided with positioning lugs 38 and bolt holes 39 by means of which and the lugs 38 the base plate 10 may be readily secured to a table or similar support.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A vise comprising a base; a post on one side of said base; clamping members pivoted on opposite sides of said post and provided with a plurality of sets of coöperating jaws of different types; a clamping chain passing over said post and coöperating with said jaws, said chain being provided with teeth on opposite sides thereof; a hook member adjustable on the other side of said base, there being a dove tail groove in said base and said hook member being slidably fitted in said groove; a slide adjustable in said dove tail groove; a threaded stem traversing said slide; a tightening nut on said stem; and a chain connected with said stem and detachably engaging said hook, substantially as described.

2. A vise comprising a base, there being a dove tail groove at one side of said base; a hook member fitted in said groove; a slide adjustable in said groove; a threaded stem traversing said slide; a tightening nut on said stem; and a chain connected with said stem and detachably engaging said hook, substantially as described.

3. A vise comprising a base; a hook member on one side of said base; a slide adjustable on the corresponding side of said base; a threaded stem traversing said slide; a tightening nut on said stem; and a flexible element connected with said stem and detachably engaging said hook, substantially as described.

In testimony whereof I have signed my name to this specification in the presence of two subscribing witnesses.

EDWARD SCHUBERT.

Witnesses:
JOSHUA R. H. POTTS,
B. G. RICHARDS.

Copies of this patent may be obtained for five cents each, by addressing the "Commissioner of Patents, Washington, D. C."